C. HEDDON.
FISH LURE.
APPLICATION FILED MAY 20, 1915.
1,276,062.
Patented Aug. 20, 1918.
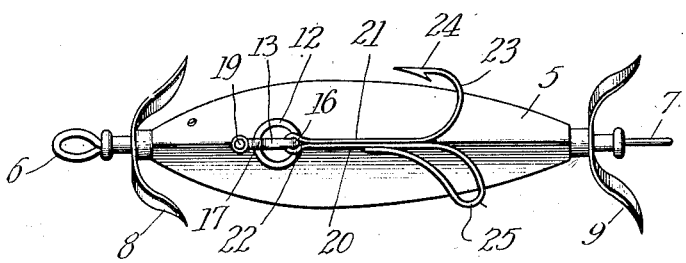
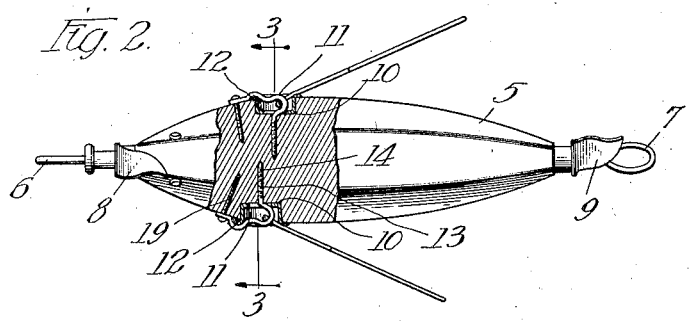
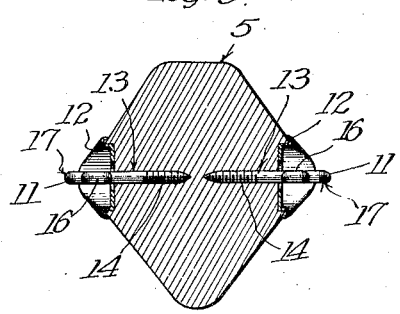
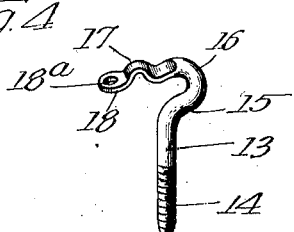
Witnesses:
Robert F. Weir
Inventor
Charles Heddon
Ames, Addington, Ames & Seibold Att'ys

UNITED STATES PATENT OFFICE.

CHARLES HEDDON, OF DOWAGIAC, MICHIGAN.

FISH-LURE.

1,276,062.  Specification of Letters Patent.  Patented Aug. 20, 1918.

Application filed May 20, 1915. Serial No. 29,254.

*To all whom it may concern:*

Be it known that I, CHARLES HEDDON, a citizen of the United States, residing at Dowagiac, in the county of Cass and State of Michigan, have invented new and useful Improvements in Fish-Lures, of which the following is a full, clear, concise, and exact description, reference being had to the accompanying drawing, forming a part of this specification.

My invention relates to improvements in fish lures, and more specificially to improvements in fish lures comprising a minnow shaped body which is to be drawn through the water and to which the fish hooks are attached.

Among the objects of my invention is to provide a device of this character which will be simple of construction and efficient in use, and in which improved means are provided for securing fish hooks to the body of the minnow.

In the accompanying drawing in which I have shown one embodiment of my invention—

Figure 1 is a side elevation of an artificial minnow showing my improved means for attaching the fish hook, the fish hook shown being of the type which has a barbed point and a loop for forcing the hook into the mouth of the fish, and for preventing the fish hook from being caught in the weeds;

Fig. 2 is a plan view partly in section showing the manner in which eyelets and fish hooks are secured to the body;

Fig. 3 is a section on the line 3—3 of Fig. 2; and

Fig. 4 is a perspective view of one of the devices for securing the fish hook and eyelet in place on the body of the minnow.

Referring now to the drawing in detail the bait comprises a fish shaped body 5 which is preferably formed of wood and ornamented in any desired manner. A screw-eye 6 is secured to the head end of the minnow to which the fish line is to be connected, and a screw-eye 7 is secured to the tail end of the minnow to which a fish hook may be secured, if desired. Spinners 8 and 9 may be rotatably mounted on the shanks of the screw-eyes 6 and 7. The body 5 is provided on its opposite sides with recesses 10 in which are seated the eyelets 11, the edges of which are flanged over the edges of the recesses 10, as shown at 12, the purpose of the eyelets 11 and the flanges 12 being to protect the body 5 of the minnow from being worn and abraded by the fish hooks rubbing thereagainst. The fish hooks are secured to the body 5 within the eyelets 11 by means of securing members 13 which also hold the eyelets in place in the recesses 10. Each securing member 13 comprises a screw threaded shank 14 which is screwed into the body of the minnow, a rearwardly bent portion 15 forming a shoulder for engaging the bottom of the eyelet 11 to assist in holding the eyelet in place, a curved portion 16 for engagement with the eye of the fish hook, a curved portion 17 which extends over and partially embraces the flange 12, and a flat portion 18 provided with an aperture 18ᵃ through which extends a screw 19 which is threaded into the body of the minnow to prevent rotation of the securing member 13 and to hold the portion 17 in engagement with the flange 12.

When the securing member 13 is in place the portion 15 bears against the bottom of the eyelet 11 and the portion 17 bears against the flange of the eyelet so that the eyelet is securely held in place by being engaged at these two points. The fish hook attached to each of the securing members is composed of a single piece of wire bent to form two shank members 20 and 21 lying side by side and forming an eye 22 for engagement with the curved portion 16. The shank member 21 is formed at the end remote from the eye into an ordinary hook bend 23, terminating in a barbed point 24. The shank member 20 is formed at the end thereof remote from the eye into a loop 25 which extends oppositely of the base of the hook bend 23. This top or bend lies on the underside and provides a means for forcing the hook 24 into the mouth of the fish when the fish strikes the hook; it also provides a means for preventing the fish hook from being caught in the weeds as the bait is dragged over the same, and it is, therefore, desirable that this bend be maintained in a position so that it is on the underside. The securing member 13 is admirably adapted for securing a fish hook of the character above described to the body of the bait. It provides a simple threaded member which can be screwed into the body of the bait for securing the fish hook thereto, and at the same time it cannot be rotated by the contortions of the fish in attempting to escape after having once been hooked. It also provides an effective means for holding the wear-resisting eyelets in place on the body.

The forward end of the securing member being held by the screw 19 prevents any danger of the member becoming unscrewed and the fish hook is therefore maintained on the body in its proper relation at all times. However, while the retaining member is maintained under normal conditions against rotation it can readily be unscrewed for the purpose of replacing broken fish hooks by simply loosening the screw 19.

While I have shown my invention in connection with a fish hook having a non-penetrating projection on its lower side it is obvious that my invention is not limited to this use, but is applicable also to hooks which do not have this non-penetrating projection and to hooks having several barbs.

As shown in Fig. 2, the securing member 13 is so constructed as to hold the hook away from the body, and the eyelet 11 holds the eye of the hook in engagement with the curved portion 16 of the securing member 13. This construction holds the point of the hook away from the body to prevent its abrasion, and also prevents the hook from getting jammed in forward inoperative position.

The hook, being held away from the body, is in proper position to catch the fish, which are attracted by the bait.

Having thus described my invention what I claim as new and desire to secure by Letters Patent is:—

1. In a fish bait, the combination with a body and a fish hook, of means for securing the fish hook to said body comprising a metal socket, a screw-eye passing through the bottom of said socket into the body, said screw-eye having a shoulder engaging the bottom of said socket for holding the same in position and having a portion thereof engaging and overlapping the edge of said socket, and means for securing said overlapping portion to the body.

2. A fishing bait comprising a body, means for attaching a line to the front end of the body, said body having a recess in its side, a metal cup-shaped member fitting in said recess, a fish hook having an eye, and means for securing said hook to said body comprising a screw-eye member having a threaded shank portion extending through said cup-shaped member and screwed in to said body portion, a U-shaped loop portion located in said cup member and extending rearwardly from said shank portion and passing through the eye of the hook, and a portion extending forwardly from said U-shaped portion and secured to said body portion to prevent rotation of said screw-eye member to keep it from screwing out of said body member, said cup-shaped member engaging the shank of the hook for holding the hook away from the body.

3. A fishing bait comprising a body, means for attaching a line to the front end of the body, said body having a recess in its side, a metal cup-shaped member fitting in said recess, a fish hook having an eye, and means for securing said hook to said body comprising a screw-eye member having a threaded shank portion extending through said cup-shaped member and screwed into said body portion, a U-shaped loop portion located in said cup member and extending rearwardly from said shank portion and passing through the eye of the hook, and a portion extending forwardly from said U-shaped portion and secured to said body portion to prevent rotation of said screw-eye member to keep it from screwing out of said body member, one arm of said U-shaped portion engaging the bottom of said cup member to hold it in place in said recess, said cup-shaped member engaging the shank of the hook for holding the hook away from the body.

4. A fish bait comprising a body, a socket member of wear-resisting material secured to said body, a fish-hook having an eye, and means for securing said hook-eye in such position with respect to said socket member that the socket member will hold the hook away from said body comprising an elongated one-piece member having one end secured to said body and having an outwardly-bowed portion in said socket member passing through the eye of the hook and a portion extending outwardly from one side of said outwardly-bowed portion and over the edge of the socket member and engaging the edge to hold the socket member in position and secured to said body.

5. A fish bait comprising a body provided with a socket, a fish-hook having an eye, and means for securing said hook-eye in such position with respect to said socket that the socket member will hold the hook away from the body, comprising an elongated one-piece member having a bend located substantially within said socket for engagement with said hook-eye, and a second bend extending up over the edge of said socket, the end beyond said second bend being secured to said body.

6. A fish bait comprising a body having a recess therein, a wear-resisting socket member seated in said recess, a fish-hook having an eye, and means for securing said hook-eye in such position with respect to said socket member that the socket member will hold the hook away from the body, comprising an elongated member having a bend located substantially within said socket member for engagement with said hook-eye, and a second bend extending up over the edge of said socket member, the end beyond said second bend being secured to said body.

7. A fish bait comprising a body provided with a socket, a fish-hook having an eye, and means for securing said hook-eye in such position with respect to said socket that the socket will hold the hook away from the body, comprising an elongated one-piece member having a bend located substantially within said socket for engagement with said hook-eye, and a second bend extending up over the edge of said socket, and means for securing said member to prevent rotation with repect to said body.

8. A fish bait comprising a body provided with a socket, a fish-hook having an eye, and means for securing said hook-eye in such position with respect to said socket that the socket will hold the hook away from the body, comprising an elongated one-piece member having a shank portion inserted into said body portion at the bottom of said socket, a bend located substantially within said socket for engagement with said hook-eye, and a second bend extending up over the edge of said socket, and means for preventing rotation of said member with respect to said body.

9. A fish bait comprising a body provided with a socket, a fish-hook having an eye, and means for securing said hook-eye in such position with respect to said socket that the socket will hold the hook away from the body, comprising an elongated one-piece member having a screw-threaded shank threaded into said body portion at the bottom of said socket, a bend located substantially within said socket for engagement with said hook-eye, and a second bend extending up over the edge of said socket, and means for preventing rotation of said member with respect to said body.

10. In a fish bait, the combination with a body and a fish-hook, of means for securing the fish-hook to said body comprising a metal socket, a screw-eye passing through the bottom of said socket into the body, said screw-eye having a shoulder engaging the bottom of said socket for holding the same in position and having a portion thereof engaging and overlapping the edge of said socket, and means for securing said overlapping portion to the body.

11. A fishing bait comprising a body, means for attaching a line to the front end of the body, said body having a recess in its side, a metal cup-shaped member fitting in said recess, a fish-hook having an eye, and means for securing said hook to said body comprising a screw-eye member having a threaded shank portion extending through said cup-shaped member and screwed into said body portion, a U-shaped loop portion located in said cup member and extending rearwardly from said shank portion and passing through the eye of the hook, and a portion extending forwardly from said U-shaped portion and secured to said body portion to prevent rotation of said screw-eye member to keep it from screwing out of said body member, one arm of said U-shaped portion engaging the bottom of said cup member to hold it in place in said recess.

12. A fishing bait comprising a body, means for attaching a line to the front end of the body, said body having a recess in its side, a metal cup-shaped member fitting in said recess, a fish-hook having an eye, and means for securing said hook to said body portion comprising a screw-eye member having a threaded shank portion extending through said cup-shaped member and screwed into said body portion, a U-shaped loop portion located in said cup member and extending rearwardly from said shank portion and passing through the eye of the hook, and a portion extending forwardly from said U-shaped portion and secured to said body portion to prevent rotation of said screw-eye member to keep it from screwing out of said body member, said forwardly-extending portion engaging the edge of said cup member to hold it in place in said recess.

13. A fish bait comprising a body provided with a socket, a fish-hook having an eye, and means for securing said eye in such position with respect to said socket that the socket will hold the hook away from the body, comprising a member having a bend completely submerged in the cavity of the socket for engagement with said eye, whereby the shank of the hook engages the edge of the socket to prevent the point of the hook from coming in contact with the body, and to hold the point of the hook in proper position for presentment to the fish, said member also having a second bend extending up over the edge of said socket, and means for securing said member to prevent rotation with respect to said body.

In witness whereof, I have hereunto subscribed my name in the presence of two witnesses.

CHARLES HEDDON.

Witnesses:
MABEL ANDREWS,
GERTRUDE FABER.